Oct. 2, 1945.   C. ENGLUND   2,386,098
STRUCTURAL PANEL
Filed Oct. 18, 1944   2 Sheets-Sheet 1

INVENTOR
*Carl Englund*
BY
*Evans & McCoy*
ATTORNEYS

Oct. 2, 1945.  C. ENGLUND  2,386,098
STRUCTURAL PANEL
Filed Oct. 18, 1944  2 Sheets-Sheet 2

INVENTOR
Carl Englund
BY Evans & McCoy
ATTORNEYS

Patented Oct. 2, 1945

2,386,098

UNITED STATES PATENT OFFICE 2,386,098

STRUCTURAL PANEL

Carl Englund, Mayfield Heights, Ohio

Application October 18, 1944, Serial No. 559,158

11 Claims. (Cl. 20—91)

This invention relates to structural panels suitable for use as doors or as sections of a partition or wall structure and has for its object to provide such panels with means for varying the stresses acting thereon so that the panel may be straightened if it should become warped.

A further object is to provide a panel that is so constructed that it may be straightened when warped by means of inward or outward thrusts applied to corner portions of the panel.

It is also an object of the invention to provide concealed thrust applying elements that are accessible at the edges of the panel.

With the above and other objects in view, the invention may be said to comprise the panel as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which Fig. 1 is a side elevation of a panel embodying the invention;

Figure 1:
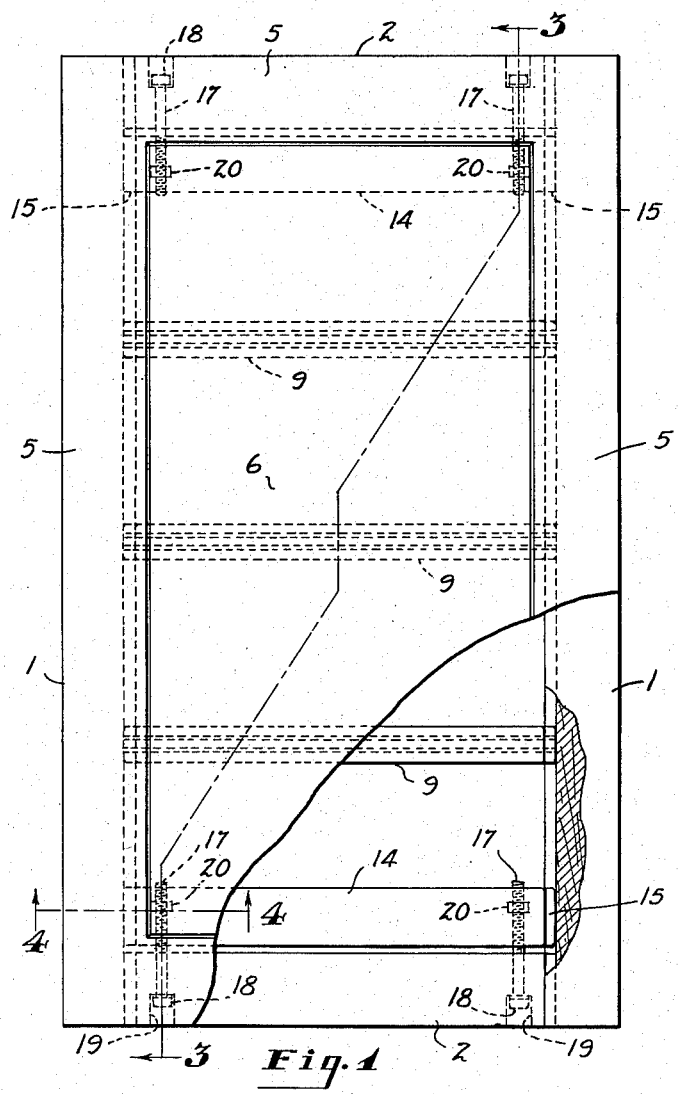
Figure 3:
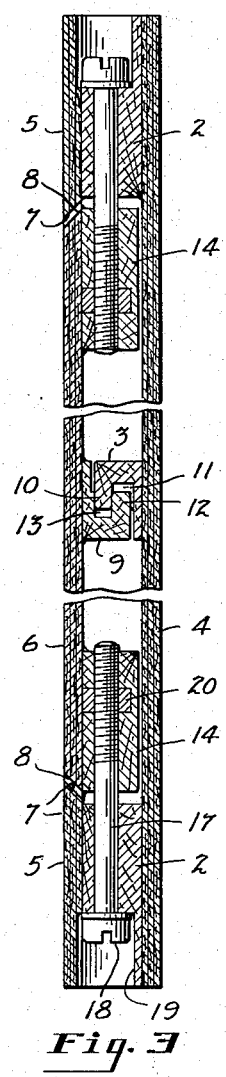
Fig. 3 is a section taken on the broken line indicated at 3—3 in Fig. 1.
Figure 2:
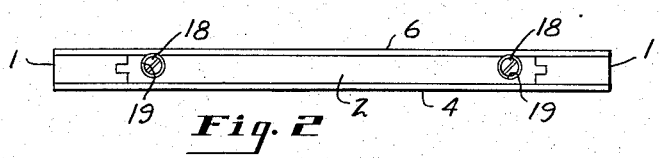
Fig. 2 is an end elevation of the panel shown in Fig. 1.
Figure 4:
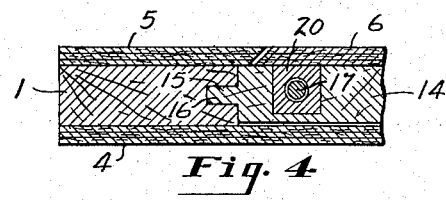
Fig. 4 is a section taken on the line indicated at 4—4 in Fig. 1.

In the accompanying drawings the invention is shown applied to a panel suitable for use as a door. This panel has an interior frame preferably a wooden frame composed of stiles 1, end rails 2 and intermediate cross rails 3. The opposite faces of the frame are covered by suitable facings composed of plywood, matchboard or the like. One of the facings indicated by the reference numeral 4 is a continuous facing entirely covering one side of the frame. The opposite facing has a marginal portion 5 attached to the stiles 1 and end rails 2 and a central portion 6 that is unattached to the marginal portion 5 and which has limited movement with respect to the marginal portion 5. The central movable portion 6 of the facing is separated from the marginal portion 5 by narrow marginal slots, the marginal portions 5 having undercut beveled edges 7 which overlie beveled edges 8 formed on the central portion 6 of the facing. The movable central portion 6 has cross rails 9 attached to its inner face which have a tongue and groove connection with the intermediate cross rails 3 of the frame, the rails 3 having tongues 10 and grooves 11 and the rails 9 having tongues 12 that enter the grooves 11 of the rails 3, and grooves 13 that receive the tongues 10 of the rails 3. The longitudinal tongue and groove joint connecting the cross rails 3 and 9 permits the portion 6 of the facing to have slight relative movements with respect to the body of the panel. The interlocking cross rails, however, prevent movements of the facing 6 other than in its own plane.

At the ends thereof the movable portion 6 has end rails 14 attached to its inner face, the end rails 14 having tongues 15 that fit in longitudinal grooves 16 in the inner edges of the stiles 1. The end rails 2 of the frame and the rails 14 attached to the facing are bored to receive screws 17 which connect the movable facing portion 6 to the end rails 2 adjacent the corners of the frame. Each screw 17 has a head 18 that is seated within a counterbore 19 in an end rail 2, and the inner end of each screw has threaded engagement with a nut 20 that is mounted in a recess in one of the rails 14. By tightening one or more of the screws, tension may be applied to one or more of the corners of the panel frame in order to straighten the panel after it has become warped.

Figure 5:
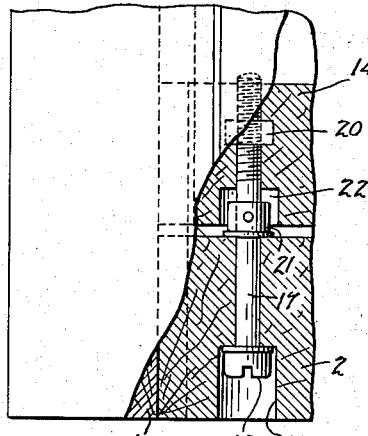
Fig. 5 is a sectional view showing a modified form of screw capable of applying either pressure or tension, that may be employed instead of the screws shown in other figures of the drawings which apply tension only.

In Fig. 5 of the drawings a collar 21 is shown attached to the screw 17 at the inner edge of the end rail of the frame, the collar 21 being disposed in a recess 22 formed in the cross rail 14 and serving to anchor the outer end of the screw 17 to the end rail 2. When the screw 17 is so anchored to the end rail, it will apply an outward pull upon the movable facing member 6 and an inward pull on a corner portion of the frame when turned in one direction and will exert an inward pressure or thrust upon the movable facing member and an outward pressure on the corner portion of the frame when turned in the opposite direction. The panel straightening effect may be obtained by applying an inward thrust at one corner of the frame and applying an outward thrust at another corner, or by applying outward or inward thrusts only to corners of the frame by means of one or more of the screws 17.

Figure 6:
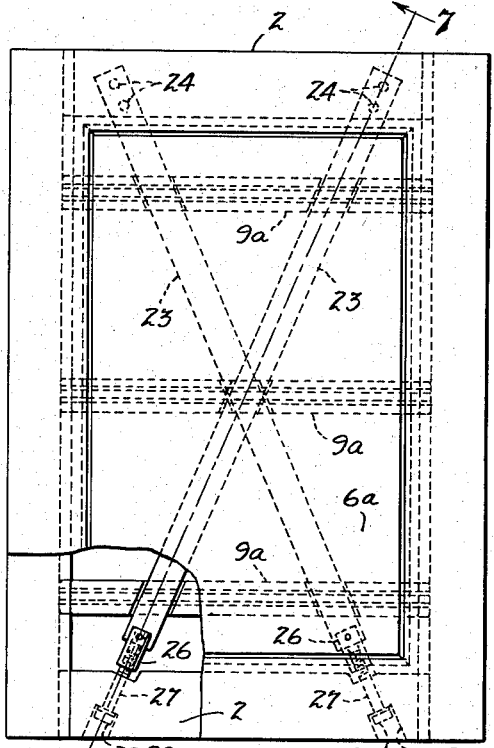
Fig. 6 is a side elevation of a modified construction embodying the invention.
Figure 7:
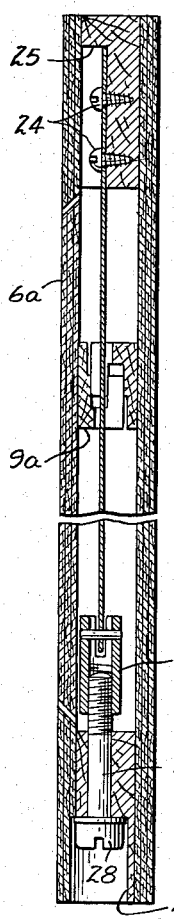
Fig. 7 is a section taken on the line indicated at 7—7 in Fig. 6.

In Figs. 6 and 7 of the drawings, a panel is shown which has a movable facing portion 6a that has cross rails 9a which are connected by a longitudinal tongue and groove joint with the intermediate cross rails 3 of the panel frame. Diagonal straps 23 extend across the portion of the panel covered by the movable facing member 6a and extend through slots formed in the interlocking cross rails 3 and 9. Each of the straps 23 is attached at one end by means of screws 24 to one of the end rails 2, the end rails to which the straps are attached being provided with recesses 25 to receive the ends of the straps. At their opposite ends the straps 23 have nuts 26 attached thereto which are engaged by diagonally disposed screws 27 that have heads 28 positioned in inclined counterbores 29 formed in the end rail 2. In this modification the straps 23 assist in holding the movable portion 6a of the facing against the inner frame of the panel and warping may be corrected by tightening one or the other of the screws 27.

Figure 9:
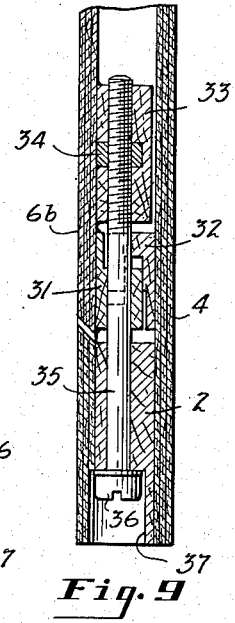
Fig. 9 is a section taken on the line indicated at 9—9 in Fig. 8.
Figure 8:
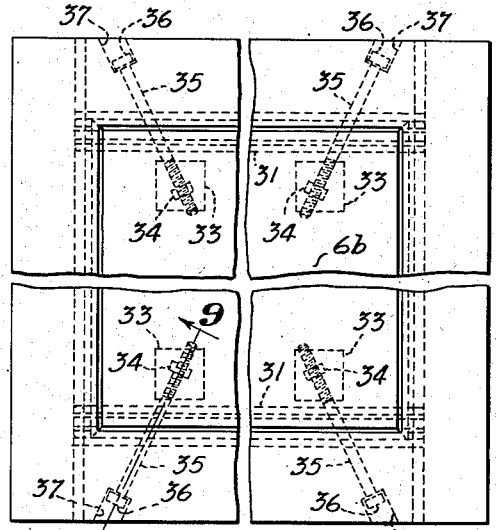
Fig. 8 is a side elevation showing another modification of the invention.

In Figs. 8 and 9 of the drawings, a panel is shown which has a movable facing portion 6b that has cross rails 31 attached to its inner face adjacent its ends, the cross rails 31 having interlocking tongue and groove connection with intermediate frame cross rails 32 that are located close to the end rails 2. The movable facing portion 6b has blocks 33 attached to its inner face adjacent each of its four corners and each block 33 is provided with a recess to receive a nut 34. The nuts 34 are engaged by diagonally disposed screws 35 that have heads 36 mounted in inclined counterbores 37 in the outer edges of the rails 2.

In each of the modifications disclosed the tension or thrust applying screws are concealed within the body of the panel and are accessible for actuation by means of a screw driver from the end edges of the panel. By means of the inward pull or outward thrust applied to corner portions of the panel frame, stresses within the frame tending to warp the panel may be equalized to prevent warping and the stress applying means is adjustable so that a panel may be straightened after it has become warped.

It is to be understood that variations and modifications of the specific device herein shown and described for purposes of illustration, may be made without departing from the spirit of the invention.

What I claim is:

1. A structural panel having an interior frame comprising stiles and end and intermediate cross rails, facings attached to opposite sides of said frame, one of said facings having a central portion that is movable with respect to marginal portions thereof, said central portion being connected to said intermediate cross rails by tongue and groove joints, and tension adjusting members connecting said movable central portion to said frame adjacent the corners thereof.

2. A structural panel having an interior frame comprising stiles and end and intermediate cross rails, facings attached to opposite sides of said frame, one of said facings having a central portion that is movable with respect to marginal portions thereof, cross rails attached to the inner face of said central portion, the latter rails being connected to said intermediate rails by longitudinal tongue and groove joints, and tension adjusting members connected to said frame adjacent the corners thereof and to said movable facing portion.

3. A structural panel having an interior frame comprising stiles and end and intermediate cross rails, facings attached to opposite sides of said frame, one of said facings having a central portion that is movable with respect to marginal portions thereof, said central portion being connected to said intermediate cross rails by tongue and groove joints, and screw threaded members adjustably connecting said central movable portion to said end cross rails adjacent the ends thereof.

4. A structural panel having an interior frame comprising stiles and end and intermediate cross rails, facings attached to opposite sides of said frame, one of said facings having a central portion that is movable with respect to marginal portions thereof, cross rails attached to the inner face of said central portion, the latter rails being connected to said intermediate rails by longitudinal tongue and groove joints, and a screw adjustably connecting each corner of said central movable facing portion with an end portion of said central frame.

5. A structural panel having an interior frame comprising stiles and end and intermediate cross rails, facings attached to opposite sides of said frame, one of said facings having a central portion that is movable with respect to marginal portions thereof, said central portion being connected to said intermediate cross rails by tongue and groove joints, said central facing portion having beveled edges underlying adjacent marginal portions of the facing, and tension adjusting members connecting corner portions of said frame to said movable facing portion.

6. A structural panel having an interior rectangular frame, facings attached to opposite sides of said frame, one of said facings having a central portion that is movable with respect to marginal portions thereof, and tension adjusting members connected to the frame adjacent the corners thereof and to said movable facing portion.

7. A structural panel having an interior rectangular frame, facings attached to opposite sides of said frame, one of said facings having a central portion that is movable with respect to marginal portions thereof, and diagonally disposed tension adjusting members attached to said movable facing portion and connecting diagonally opposite corners of said frame.

8. A structural panel having an interior rectangular frame, facings attached to opposite sides of said frame, one of said facings having a central portion that is movable with respect to marginal portions thereof, internally threaded members attached to the inner side of said central facing portion adjacent its corners, and screws extending through end portions of the frame adjacent its corners and threaded into said members.

9. A structural panel having an interior rectangular frame, facings attached to opposite sides of said frame, one of said facings having a central portion that is movable with respect to marginal portions thereof, internally threaded members attached to the inner side of said central facing portion adjacent its corners, screws extending through end portions of the frame adjacent its corners and threaded into said members, and means for holding each screw against endwise movement with respect to the frame.

10. A structural panel having an interior rectangular frame, facings attached to opposite sides of said frame, one of said facings having a central portion that is movable with respect to marginal portions thereof, said central portion having a cross rail attached to the inner side thereof, diagonal straps attached to said frame at one end adjacent the corners, said straps extending through said cross rail, and screws connecting said straps to the opposite ends of the frame.

11. A structural panel having an interior frame comprising stiles and end and intermediate cross rails, plywood facings attached to and covering opposite sides of said frame, one of said facings having a central rectangular portion separated from marginal portions thereof by narrow marginal slots, and movable with respect to said marginal portions, said movable facing portion having cross rails connected to the frame cross rails by longitudinal tongue and groove joints, threaded members attached to the inner sides of said movable facing portion adjacent its corners, and screws extending through said end rails and threaded in said members.

CARL ENGLUND.